(12) United States Patent
Comerica et al.

(10) Patent No.: US 11,665,058 B2
(45) Date of Patent: May 30, 2023

(54) REMOTE FACTORY RESET OF AN ELECTRONIC DEVICE

(71) Applicant: ARRIS Enterprises LLC, Suwanee, GA (US)

(72) Inventors: Subash Tirupachur Comerica, Sunnyvale, CA (US); Wenge Ren, Sunnyvale, CA (US); Wei Sheng Hsu, San Jose, CA (US); Craig Owens, San Carlos, CA (US)

(73) Assignee: ARRIS Enterprises, LLC, Suwanee, GA (US)

( * ) Notice: Subject to any disclaimer, the term of this patent is extended or adjusted under 35 U.S.C. 154(b) by 204 days.

(21) Appl. No.: 16/921,984

(22) Filed: Jul. 7, 2020

(65) Prior Publication Data

US 2021/0014110 A1 Jan. 14, 2021

Related U.S. Application Data

(60) Provisional application No. 62/871,706, filed on Jul. 8, 2019, provisional application No. 62/871,701, filed on Jul. 8, 2019.

(51) Int. Cl.
*H04L 41/082* (2022.01)
*H04L 5/00* (2006.01)
(Continued)

(52) U.S. Cl.
CPC .......... *H04L 41/082* (2013.01); *G06F 9/4405* (2013.01); *G06F 11/1438* (2013.01);
(Continued)

(58) Field of Classification Search
CPC ... H04L 41/082; H04L 41/0879; H04L 41/22; H04L 41/24; H04L 41/08; H04L 41/0876;
(Continued)

(56) References Cited

U.S. PATENT DOCUMENTS 8,108,723 B2 1/2012 Diab
2002/0133573 A1\* 9/2002 Matsuda ................. H04L 41/00
709/226
(Continued)

OTHER PUBLICATIONS

"Factory Reset," Web page <https://www.techopedia.com/definition/17154/factory-reset>, 1 page, Jan. 3, 2016, retrieved from Internet Archive Wayback Machine <https://web.archive.org/web/20160103070858/https://www.techopedia.com/definition/17154/factory reset> on Oct. 11, 2022. (Year: 2016).\*
(Continued)

*Primary Examiner* — Joshua Kading
(74) *Attorney, Agent, or Firm* — Steven Stupp; Stewart Wiener

(57) ABSTRACT

During operation, an electronic device receives a packet or a frame associated with a second electronic device, where the packet or the frame includes information specifying a factory reset command. For example, the second electronic device may be a dynamic host configuration protocol (DHCP) server or may perform functions of a DHCP server. Moreover, the packet or the frame may include an acknowledgment (ACK) in a discover, offer, request and acknowledgment (DORA) procedure, and the information may be included in an option 43 subfield or an option 52 subfield in the packet or the frame. In response to receiving the factory reset command, the electronic device performs a factory reset. Note that the factory reset may restore firmware in the electronic device to a factory-fresh version and a configuration of the electronic device to a factory-fresh state, may erase memory in the electronic device.

20 Claims, 10 Drawing Sheets

(51) Int. Cl.
| | |
|---|---|
| *H04L 41/08* | (2022.01) |
| *G06F 11/14* | (2006.01) |
| *H04L 12/12* | (2006.01) |
| *H04L 61/5014* | (2022.01) |
| *H04W 88/08* | (2009.01) |
| *G06F 15/177* | (2006.01) |
| *G06F 9/4401* | (2018.01) |
| *H04L 41/00* | (2022.01) |
| *H04L 41/22* | (2022.01) |

(52) U.S. Cl.
CPC .......... *G06F 15/177* (2013.01); *H04L 5/0055* (2013.01); *H04L 12/12* (2013.01); *H04L 41/0879* (2013.01); *H04L 61/5014* (2022.05); *H04L 41/22* (2013.01); *H04L 41/24* (2013.01); *H04W 88/08* (2013.01)

(58) Field of Classification Search
CPC . H04L 41/0883; H04L 41/0886; H04L 41/20; H04L 41/26; H04L 5/0055; H04L 12/12; H04L 61/2015; H04L 67/34; G06F 9/4405; G06F 9/4416; G06F 11/1438; G06F 11/1441; G06F 15/177; H04W 88/08
See application file for complete search history.

(56) References Cited

U.S. PATENT DOCUMENTS

| | | | |
|---|---|---|---|
| 2006/0047791 A1* | 3/2006 | Bahl | H04L 61/2015 709/220 |
| 2010/0107223 A1* | 4/2010 | Zheng | H04L 63/10 726/3 |
| 2010/0290366 A1* | 11/2010 | Garcia | H04L 43/065 370/254 |
| 2013/0170432 A1* | 7/2013 | O'Brien | H04W 48/10 370/328 |
| 2014/0115354 A1 | 4/2014 | Jabbaz et al. | |
| 2014/0372805 A1 | 12/2014 | Rijnders et al. | |
| 2016/0241702 A1* | 8/2016 | Gorajala Chandra | H04W 72/0433 |
| 2016/0337945 A1 | 11/2016 | Watt et al. | |
| 2016/0353258 A1 | 12/2016 | Stuntebeck et al. | |
| 2018/0287874 A1 | 10/2018 | Rzezak et al. | |
| 2021/0235566 A1* | 7/2021 | Haverlag | H05B 47/18 |
| 2021/0258215 A1* | 8/2021 | Brophy | G06Q 30/08 |

OTHER PUBLICATIONS

"International Preliminary Report on Patentability and Written Opinion for corresponding International Application No. PCT/US2020/040909, dated Jan. 11, 2022, 7 pages".

International Search Report and the Written Opinion of the International Searching Authority corresponding to International Patent Application No. PCT/US2020/040909 (10 pages) (dated Sep. 25, 2020).

* cited by examiner

REMOTE FACTORY RESET OF AN ELECTRONIC DEVICE

CROSS-REFERENCE TO RELATED APPLICATION

This application claims priority under 35 U.S.C. 119(e) to: U.S. Provisional Application Ser. No. 62/871,706, "Factory Reset of Equipment Without Remote Access to or Physical Presence at the Equipment," filed on Jul. 8, 2019, by Subash Tirupachur Comerica, et al.; and to U.S. Provisional Application Ser. No. 62/871,701, "Remote Factory Reset of an Access Point," filed on Jul. 8, 2019, by Subash Tirupachur Comerica, et al., the contents of both of which are herein incorporated by reference.

BACKGROUND

Field

The described embodiments relate to techniques for performing a factory reset of an electronic device. Notably, the described embodiments relate to techniques for remotely initiating a factory reset of an electronic device.

Related Art

Many electronic devices are capable of wirelessly communicating with other electronic devices. For example, these electronic devices can include a networking subsystem that implements a network interface for a wireless local area network (WLAN), e.g., a wireless network such as described in the Institute of Electrical and Electronics Engineers (IEEE) 802.11 standard. For example, a wireless network may include an access point that communicates wirelessly with one or more associated electronic devices (which are sometimes referred to as 'clients').

After deployment or installation, it is sometimes necessary to reset an electronic device, such as an access point. However, it can sometimes be difficult to reset an access point. For example, a remote software reset may not be possible when communication between the access point and a controller of the access point is unavailable. Alternatively or additionally, depending on a state of the software or firmware in the access point, a remote software reset may not be possible.

In these cases, a factory reset may be needed. Typically, a factory reset of an access point can be initiated by activating a physical (such as hardware) switch or button in the access point. However, it is sometimes difficult to access the access point, such as when the access point is located or installed in a ceiling deployment. Moreover, when there are multiple access points in a deployment, it can be expensive and time-consuming to perform factory resets by manually activating the physical switch or buttons on these access points.

SUMMARY

In a first group of embodiments, an electronic device (such as an access point) that performs a factory reset is described. This electronic device may include: a network node; and an interface circuit that communicates with a second electronic device. During operation, the electronic device may receive, at the network node, a packet or a frame associated with the second electronic device, where the packet or the frame includes information specifying a factory reset command. Then, in response to receiving the factory reset command, the electronic device may perform the factory reset.

Note that the second electronic device may be a dynamic host configuration protocol (DHCP) server or may perform functions of a DHCP server. Alternatively or additionally, the second electronic device may be an access point or a controller of the electronic device.

Moreover, the factory reset may restore firmware in the electronic device to a factory-fresh version and a configuration of the electronic device to a factory-fresh state, and may erase memory in the electronic device.

Furthermore, the packet or the frame may include an acknowledgment (ACK) in a discover, offer, request and acknowledgment (DORA) procedure. In some embodiments, the electronic device may determine whether a predefined time interval has elapsed and, when the predefined time interval has elapsed, may provide, to the network node, a discover message addressed to the second electronic device, where the discover message initiates the DORA procedure. Alternatively or additionally, the electronic device receive, at the network node, a negative acknowledgment (NACK) associated with the second electronic device. In response to receiving the NACK, the electronic device may provide, to the network node, a discover message addressed to the second electronic device, where the discover message initiates the DORA procedure. Note that the information may be included in an option 43 subfield or an option 52 subfield in the packet or the frame.

Additionally, the electronic device may ignore the packet or the frame when received outside of a predefined time interval or when a number of received instances of the packet or the frame exceeds a predefined value.

In some embodiments, the electronic device may include memory that stores program instructions, and a processor that executes the program instructions. When executed by the processor, the program instructions may cause the electronic device to perform the factory reset.

Another embodiment provides the DHCP server.

Another embodiment provides the controller.

Another embodiment provides a computer-readable storage medium for use with the electronic device. When executed by the electronic device, this computer-readable storage medium causes the electronic device to perform at least some of the aforementioned operations.

Another embodiment provides a method, which may be performed by the electronic device. This method includes at least some of the aforementioned operations.

Another embodiment provides a computer-readable storage medium for use with the DHCP server. When executed by the DHCP server, this computer-readable storage medium causes the DHCP server to perform at least some of the aforementioned operations.

Another embodiment provides a method, which may be performed by the DHCP server. This method includes at least some of the aforementioned operations.

Another embodiment provides a computer-readable storage medium for use with the controller. When executed by the controller, this computer-readable storage medium causes the controller to perform at least some of the aforementioned operations.

Another embodiment provides a method, which may be performed by the controller. This method includes at least some of the aforementioned operations.

In a second group of embodiments, an electronic device that performs a factory reset without remote network access to the electronic device or physical presence at the electronic device is described. This electronic device may include: a network interface that communicates with a network, a processor, and a memory that stores program instructions. During operation, the electronic device may receive an external indication. When the electronic device is in a malfunctioning operating state, the electronic device may process the external indication. The processing of the external indication may cause the electronic device to initiate the factory reset of the device.

Note that receiving the external indication may include receiving Power over Ethernet (PoE) signaling from a PoE power source and/or which may be received via the network interface. For example, the PoE signaling may include vendor specific PoE signaling extensions.

Moreover, the external indication may include a power pattern. Furthermore, the electronic device may store a predefined power pattern, where receiving the external indication may include receiving a toggling of power to the device. Additionally, processing the external indication may include: detecting changes in power state during the toggling of the power; recording a power pattern of the detected changes; upon boot up of the device, comparing the power pattern of the detected changes to the predefined power pattern; and initiating the factory reset of the device when the power pattern of the detected changes corresponds to the predefined power pattern.

For example, processing the external indication may include: erasing the recorded power pattern when the power pattern of the detected changes corresponds to the predefined power pattern. Alternatively or additionally, the toggling of the power is controlled by: a network power switch; or manually removing and applying power to the device. In some embodiments, the toggling of power includes at least one of: toggling a voltage between a first voltage associated with an operational power state, and a non-zero voltage different from the first voltage, and/or toggling an amperage between a first amperage associated with the operational power state, and a non-zero amperage different from the first amperage.

Note that the electronic device may include an access point.

Moreover, the external indication may include changes in a power state, where the changes correspond to a predefined power pattern. Furthermore, the electronic device may include: a field programmable gate array (FPGA) that stores the predefined power pattern and a received power pattern; and a microcontroller that detects the changes in the power state including during a toggling of the power, and that records in the FPGA the received power pattern of the detected changes. Additionally, when the program instructions are executed, the program instructions may cause the processor to: upon boot up of the electronic device, compare the received power pattern stored in the FPGA to the predefined power pattern; and initiate the factory reset of the device when the received power pattern corresponds to the predefined power pattern. In some embodiments, when the program instructions are executed, the program instructions further cause the processor to: erase the recorded received power pattern from the FPGA when the received power pattern corresponds to the predefined power pattern.

Another embodiment provides a computer-readable storage medium for use with the electronic device. When executed by the electronic device, this computer-readable storage medium causes the electronic device to perform at least some of the aforementioned operations.

Another embodiment provides a method, which may be performed by the electronic device. This method includes at least some of the aforementioned operations.

Another embodiment provides a system. This system includes: an access that enables electronic devices to wirelessly connect to or access the system; and a network switch that routes data among components of the system, including routing data to and from the access point, and one or more wired connections among the components of the system, including a wired connection communicatively coupling the access point and the network switch. During operation, the access point may receive, when in a malfunctioning operational state, an external indication for causing the access point to initiate a factory reset. In response, the access point may initiate the factory reset, when in the malfunctioning operational state, based at least in part on receiving the external indication.

Note that the wired connection may include an Ethernet cable; and the external indication may include PoE signaling from the network switch. Moreover, the external indication may include a toggling of power to the access point. Furthermore, the access point may: detect changes in power state during the toggling of the power; upon boot up, compare the detected changes to a predefined power pattern; and initiate the factory reset when the detected changes correspond to the predefined power pattern. Alternatively or additionally, the system may include: a network power switch that provides power to the access point, and the toggling of the power may be controlled by the network power switch. In some embodiments, the external indication includes a toggling of power to the access point, and the toggling of the power includes at least one of: toggling of a voltage between a first voltage associated with an operational power state, and a non-zero voltage different from the first voltage, and/or toggling of an amperage between a first amperage associated with the operational power state, and a non-zero amperage different from the first amperage.

Another embodiment provides a computer-readable storage medium for use with the access point or another component in the system. When executed by the access point or the other component in the system, this computer-readable storage medium causes the access point or the other component in the system to perform at least some of the aforementioned operations.

Another embodiment provides a method, which may be performed by the access point or the other component in the system. This method includes at least some of the aforementioned operations.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
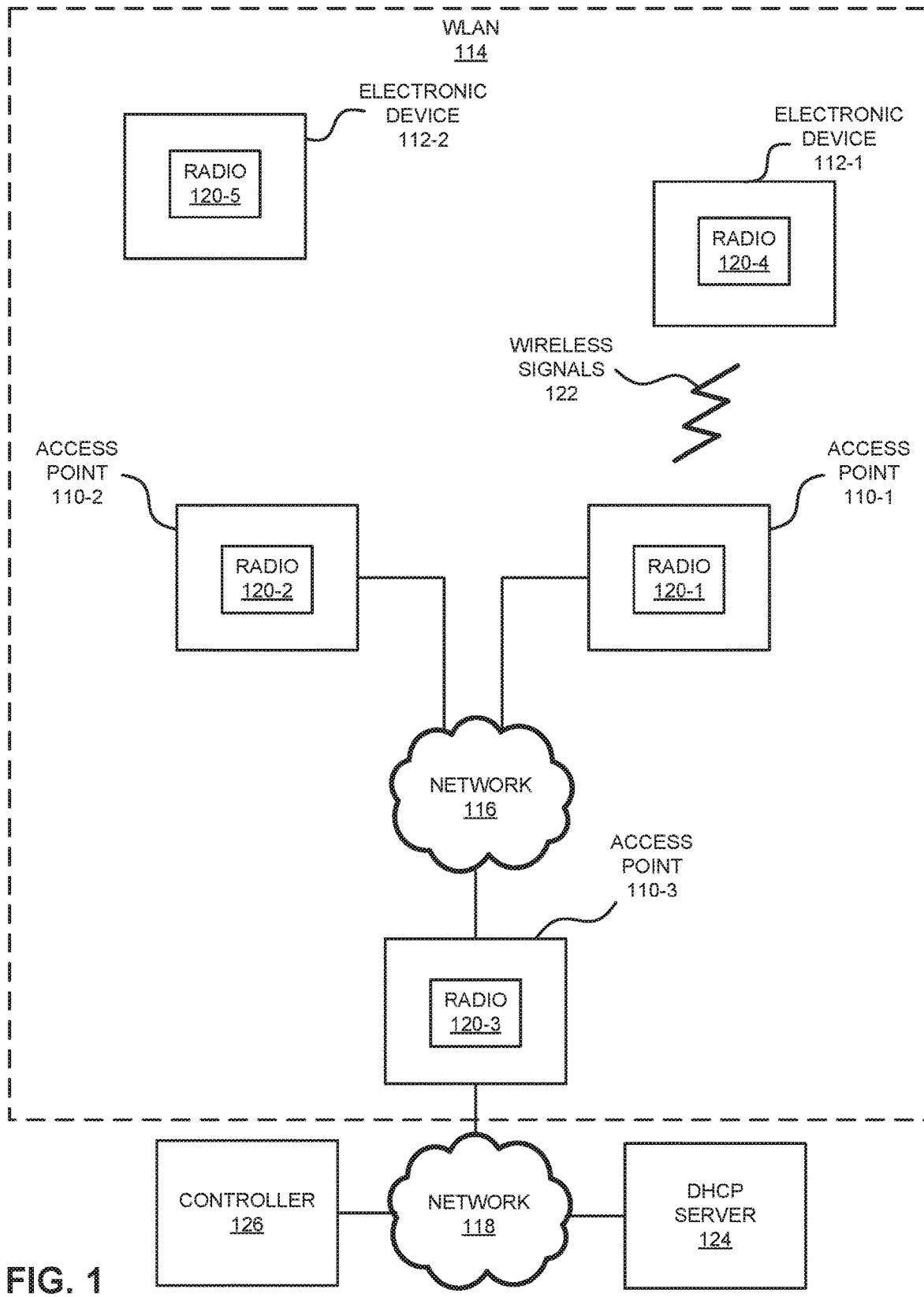
FIG. 1 is a block diagram illustrating an example of communication among access points and electronic devices in a subnet in accordance with an embodiment of the present disclosure.

An electronic device (such as an access point) that performs a factory reset is described. During operation, the access point receives a packet or a frame associated with a second electronic device, where the packet or the frame includes information specifying a factory reset command. For example, the second electronic device may be a DHCP server or may perform functions of a DHCP server. Moreover, the packet or the frame may include an ACK in a DORA procedure, and the information may be included in an option 43 subfield or an option 52 subfield in the packet or the frame. In response to receiving the factory reset command, the access point performs the factory reset. Note that the factory reset may restore firmware in the access point to a factory-fresh version and a configuration of the access point to a factory-fresh state, and may erase memory in the access point.

By performing the factory reset, this communication techniques may allow the access point to be remotely restored to a know state. This capability may simplify and reduce the effort needed to reset the access point. Moreover, it may allow the access point to be reset even when physical access to the access point is difficult (such as after the access point is installed or deployed), when communication between the access point and a remote controller is unavailable or when a software in the access point is in a state that prevents a software reset (instead of a factory reset) from being performed. Consequently, the communication techniques may facilitate ease of use of the access point and may improve the overall user experience.

In the discussion that follows, an electronic device and an access point may communicate packets in accordance with a wireless communication protocol, such as an Institute of Electrical and Electronics Engineers (IEEE) 802.11 standard (which is sometimes referred to as 'Wi-Fi', from the Wi-Fi Alliance of Austin, Tex.), Bluetooth (from the Bluetooth Special Interest Group of Kirkland, Wash.), and/or another type of wireless interface. For example, an IEEE 802.11 standard may include one or more of: IEEE 802.11a, IEEE 802.11b, IEEE 802.11g, IEEE 802.11-2007, IEEE 802.11n, IEEE 802.11-2012, IEEE 802.11-2016, IEEE 802.11ac, IEEE 802.11ax, IEEE 802.11ba, IEEE 802.11be, or other present or future developed IEEE 802.11 technologies. In the discussion that follows, Wi-Fi is used as an illustrative example. However, a wide variety of communication protocols (such as Long Term Evolution or LTE, another cellular-telephone communication protocol, etc.) may be used. The wireless communication may occur in one or more bands of frequencies, such as: a 900 MHz, a 2.4 GHz, a 5 GHz, 6 GHz, the Citizens Broadband Radio Spectrum or CBRS (e.g., a frequency band near 3.5 GHz), a band of frequencies used by LTE or another cellular-telephone communication protocol or a data communication protocol, and/or a 60 GHz frequency band. (Note that IEEE 802.11ad communication over a 60 GHz frequency band is sometimes referred to as 'WiGig.' In the present discussion, these embodiments also encompassed by 'Wi-Fi.') In some embodiments, communication between electronic devices may use multi-user transmission (such as orthogonal frequency division multiple access or OFDMA).

Moreover, the access point may communicate with other access points and/or computers in a network using a wired communication protocol, such as an IEEE 802.3 standard (which is sometimes referred to as 'Ethernet') and/or another type of wired interface. In the discussion that follows, Ethernet is used as an illustrative example.

FIG. 1 presents a block diagram illustrating an example of communication among one or more access points 110 and electronic devices 112 (such as a cellular telephone, and which are sometimes referred to as 'clients') in a WLAN 114 in accordance with some embodiments. Notably, access points 110 may communicate with each other in WLAN 114 using wireless and/or wired communication. Moreover, access points 110 may be configured and managed via one or more controllers, such as controller 108. Furthermore, at least one of access points 110 (such as access point 110-3) may provide access to a network 118 (such as the Internet, a cable network, a cellular-telephone network, etc.) that is external to WLAN 114. For example, access points 110 may communicate with DHCP server 124 or controller 126 (such as a cloud-based controller that configures and manages access points 110) via network 118. While DHCP server 108 is illustrated as being external to WLAN 114 in FIG. 1, in some embodiments DHCP server 108 is implemented within WLAN 114 and/or functions of DHCP server 108 may be performed by at least one of access points 110. Additionally, at least some of access points 110 (such as access point 110-1 and access point 110-2) may communicate with electronic devices 112 using wireless communication. Note that access points 110 may include a physical access point and/or a virtual access point that is implemented in software in an environment of an electronic device or a computer.

The wired and/or wireless communication among access points 110 in WLAN 114 may occur via network 116 (such as an intra-net, a mesh network, point-to-point connections and/or the Internet) and may use a network communication protocol, such as Ethernet. This network may include one or more routers and/or switches (not shown). Furthermore, the wireless communication using Wi-Fi may involve: transmitting advertising frames on wireless channels, detecting one another by scanning wireless channels, establishing connections (for example, by transmitting association or attach requests), and/or transmitting and receiving packets (which may include the association requests and/or additional information as payloads). In some embodiments, the wired and/or wireless communication among access points 110 also involves the use of dedicated connections, such as via a peer-to-peer (P2P) communication technique.

As described further below with reference to FIG. 11, access points 110 and/or electronic devices 112 may include subsystems, such as a networking subsystem, a memory subsystem and a processor subsystem. In addition, access points 110 and electronic devices 112 may include radios 120 in the networking subsystems. More generally, access points 110 and electronic devices 112 can include (or can be included within) any electronic devices with the networking subsystems that enable access points 110 and electronic devices 112 to communicate with each other using wireless and/or wired communication. This wireless communication can comprise transmitting advertisements on wireless channels to enable access points 110 and/or electronic devices 112 to make initial contact or detect each other, followed by exchanging subsequent data/management frames (such as association requests and responses) to establish a connection, configure security options (e.g., Internet Protocol Security), transmit and receive packets or frames via the connection, etc. Note that while instances of radios 120 are shown in access points 110 and electronic devices 112, one or more of these instances may be different from the other instances of radios 120.

As can be seen in FIG. 1, wireless signals 122 (represented by a jagged line) are transmitted from radio 120-1 in access point 110-1. These wireless signals may be received by radio 120-4 in electronic device 112-1. Notably, access point 110-1 may transmit packets. In turn, these packets may be received by electronic device 112-1. Moreover, access point 110-1 may allow electronic device 112-1 to communicate with other electronic devices, computers and/or servers via networks 116 and/or 118.

Note that the communication among access points 110 and/or with electronic devices 112 may be characterized by a variety of performance metrics (which are sometimes referred to as 'communication performance metrics'), such as: a received signal strength (RSSI), a data rate, a data rate for successful communication (which is sometimes referred to as a 'throughput'), an error rate (such as a retry or resend rate), a mean-square error of equalized signals relative to an equalization target, intersymbol interference, multipath interference, an SNR, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

In the described embodiments processing a packet or a frame in access points 110 and electronic devices 112 includes: receiving signals (such as wireless signals 122) with the packet or the frame; decoding/extracting the packet or the frame from received wireless signals 122 to acquire the packet or the frame; and processing the packet or the frame to determine information contained in the packet or the frame.

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

As noted previously, sometimes it can be difficult to perform a software reset of one of access points 110 (such as access point 110-1). Alternatively or additionally, it may be difficult to perform a factory reset of access point 110-1 by activating a physical (such as hardware) switch or button in access point 110-1. For example, access point 110-1 may be installed at a location that is not easily accessed, such as in a ceiling mounted deployment. Moreover, it can be time consuming and expensive to have users perform factory resets in deployments in which there are multiple access points 110, such as in corporate or enterprise deployments.

As described further below with reference to FIGS. 2-5, in order to address this problem, the communication techniques may allow a user (such as a network administrator) to remotely initiate a factory reset of an access point (such as access point 110-1). Notably, a user may configure DHCP server 124 to initiate a factory reset of one or more of access points 110 (such as access point 110-1). Alternatively, the user may use controller 126 to provide an instruction to reconfigure DHCP server 124 to initiate a factory reset of one or more of access points 110 (such as access point 110-1). Note that the configuration or the instruction may include or may specify a media access control (MAC) address and/or an Internet Protocol (IP) address of access point 110-1.

Then, DHCP server 124 may provide a NACK to access point 110-1. In response to receiving the NACK, access point 110-1 may initiate a DORA procedure with DHCP server 124. Notably, access point 110-1 may provide a discover message to DHCP server 124. In response, DHCP server 124 may provide an offer message with an IP address to access point 110-1. Then, access point 110-1 may provide a request for the IP address to DHCP server 124. Next, DHCP server 124 may provide an ACK to access point 110-1.

Typically, the ACK may indicate that access point 110-1 gets the IP address. In some embodiments, the ACK may also include information that specifies a factory reset of access point 110-1. For example, the information may be included in an option 43 subfield or an option 52 subfield in the ACK. Notably, instead of or in addition to an IP address (such as of controller 126), the option 43 subfield or the option 52 subfield may include the factory reset command for access point 110-1. In response to receiving the ACK with the information, access point 110-1 may perform a factory reset. Note that the factory reset may restore firmware in access point 110-1 to a factory-fresh version and a configuration of access point 110-1 to a factory-fresh state, and may erase memory in access point 110-1. In contrast, a software reset may only restore a state of software in access point 110-1, such as by rebooting the software.

Subsequently, the user may reconfigure DHCP server 124, so that DHCP server 124 does not initiate a factory reset of access point 110-1 if access point 110-1 performs another instance of the DORA procedure. Alternatively or additionally, the user may reconfigure DHCP server 124 via controller 126, such as by using controller 126 to provide another instruction to DHCP server 124 to reconfigure DHCP server 124.

While the previous example illustrated the information being provided in an ACK during a DORA procedure, more generally the information may be provided to access point 110-1 in at least a packet or a frame by DHCP server 124. In some embodiments, the information may be provided to access point 110-1 in at least a packet or a frame by controller 126 and/or another access point (such as another of access points 110) that performs the functions of a DHCP server.

In order to prevent excessive or inadvertent factory resets of access point 110-1, access point 110-1 may ignore the ACK (or the packet or the frame) when received outside of a predefined time interval (such as an hour, a day or a week) or when a number of received instances of the ACK (or the packet or the frame) exceeds a predefined value (such as 2, 5 or 10 instances of the ACK, which may occur during a predefined time interval, e.g., an hour, a day or a week).

While the preceding embodiment illustrated the use of controller 126 and/or DHCP server 124 to initiate the factory reset, in other embodiments access point 110-1 may initiate the factory reset. For example, access point 110-1 may determine whether a predefined time interval (such as an hour, a day or a week) has elapsed. When the predefined time interval has elapsed, access point 110-1 may provide a discover message DHCP server 124, where the discover message initiates the DORA procedure and, thus, the factory reset (via the ACK provided by DHCP server 124 with the information). In some embodiments, DHCP server 124 may be preconfigured to perform the factory reset during the DORA procedure. However, in other embodiments, access point 110-1 includes additional information in the discover message that indicates that DHCP server 124 should initiate the factory reset via the ACK in the DORA procedure.

In these ways, the communication techniques may allow a user to remotely initiate a factory reset of one or more access points 110. This capability may reduce the time and effort needed to perform a factory reset of the one or more access points 110. Consequently, the communication techniques may facilitate ease of use of access points 110 and may improve the overall user experience.

Figure 2:
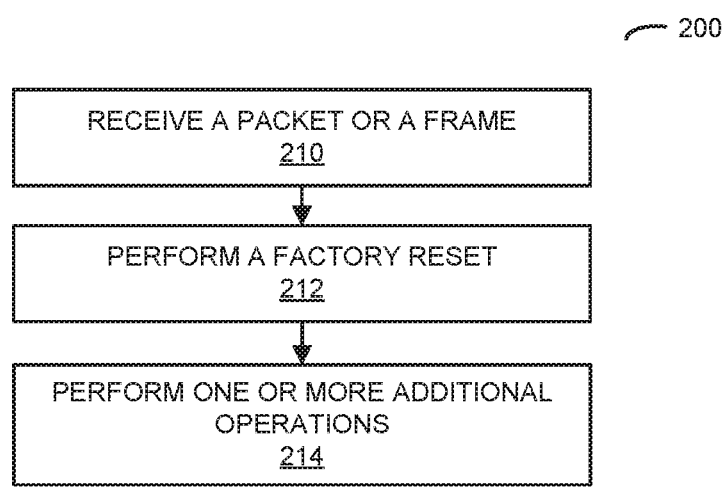
FIG. 2 is a flow diagram illustrating an example method for performing a factory reset using an access point in FIG. 1 in accordance with an embodiment of the present disclosure.

We now describe embodiments of the method. FIG. 2 presents a flow diagram illustrating an example of a method 200 for performing a factory reset using an access point, such as access point 110-1 in FIG. 1.

During operation, the access point may receive, at the network node, a packet or a frame (operation 210) associated with the electronic device, where the packet or the frame includes information specifying a factory reset command.

Then, in response to receiving the factory reset command, the access point may perform the factory reset (operation 212). Note that the factory reset may restore firmware in the access point to a factory-fresh version and a configuration of the access point to a factory-fresh state, and may erase memory in the access point.

In some embodiments, the access point optionally performs one or more additional operations (operation 214).

Note that the electronic device may be a DHCP server or may perform functions of a DHCP server. Alternatively or additionally, the electronic device may be another access point or a controller of the access point.

Furthermore, the packet or the frame may include an ACK in a DORA procedure. In some embodiments, the access point may determine whether a predefined time interval has elapsed and, when the predefined time interval has elapsed, may provide, to the network node, a discover message addressed to the electronic device, where the discover message initiates the DORA procedure. Alternatively or additionally, the access point receive, at the network node, a NACK associated with the electronic device. In response to receiving the NACK, the access point may provide, to the network node, a discover message addressed to the electronic device, where the discover message initiates the DORA procedure. Note that the information may be included in an option 43 subfield or an option 52 subfield in the packet or the frame.

Additionally, the access point may ignore the packet or the frame when received outside of a predefined time interval or when a number of received instances of the packet or the frame exceeds a predefined value.

In some embodiments, the access point may include memory that stores program instructions, and a processor that executes the program instructions. When executed by the processor, the program instructions may cause the access point to perform the factory reset.

Figure 3:
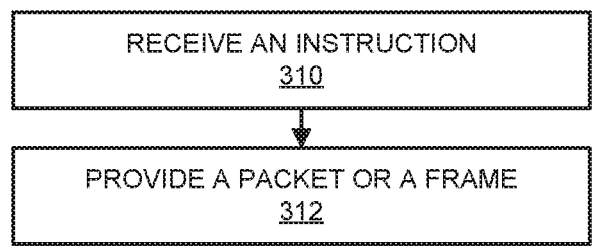
FIG. 3 is a flow diagram illustrating an example method for performing a factory reset using a dynamic host configuration protocol (DHCP) server in FIG. 1 in accordance with an embodiment of the present disclosure.

FIG. 3 presents a flow diagram illustrating an example of a method 300 for performing a factory reset using a DHCP server, such as DHCP server 124 in FIG. 1 or another electronic device that performs functions of a DHCP server.

During operation, the DHCP server may optionally receive an instruction (operation 310), either via a user interface in the DHCP server or in a message associated with a controller, where the instruction indicates that DHCP server is to perform a factory reset of an access point.

In response to receiving the instruction, the DHCP server may provide a packet of frame (operation 312) addressed to the access point, where the packet or the frame may include information that specifies a factory reset command. For example, the DHCP server may provide a NACK addressed to the access point. Then, the DHCP server may perform a DORA procedure with the access point, and the packet or the frame may be an ACK in the DORA procedure.

Figure 4:
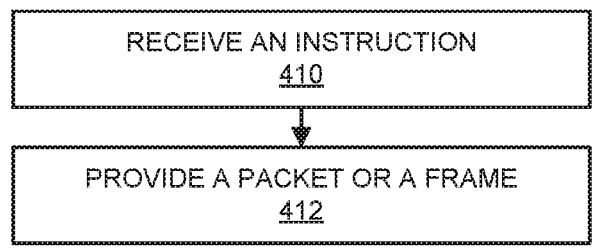
FIG. 4 is a flow diagram illustrating an example method for performing a factory reset using a controller in FIG. 1 in accordance with an embodiment of the present disclosure.

FIG. 4 presents a flow diagram illustrating an example of a method 400 for performing a factory reset using a controller, such as controller 126 in FIG. 1.

During operation, the controller may receive, via a user interface, an instruction (operation 410) to perform a factory reset of an access point via a DHCP server.

In response, the controller may provide a packet or a frame (operation 412) addressed to the DHCP server, where the packet or the frame indicates that DHCP server is to perform a factory reset of the access point.

In some embodiments of methods 200 (FIG. 2), 300 (FIG. 3) and/or 400, there may be additional or fewer operations. Furthermore, the order of the operations may be changed, and/or two or more operations may be combined into a single operation.

Figure 5:
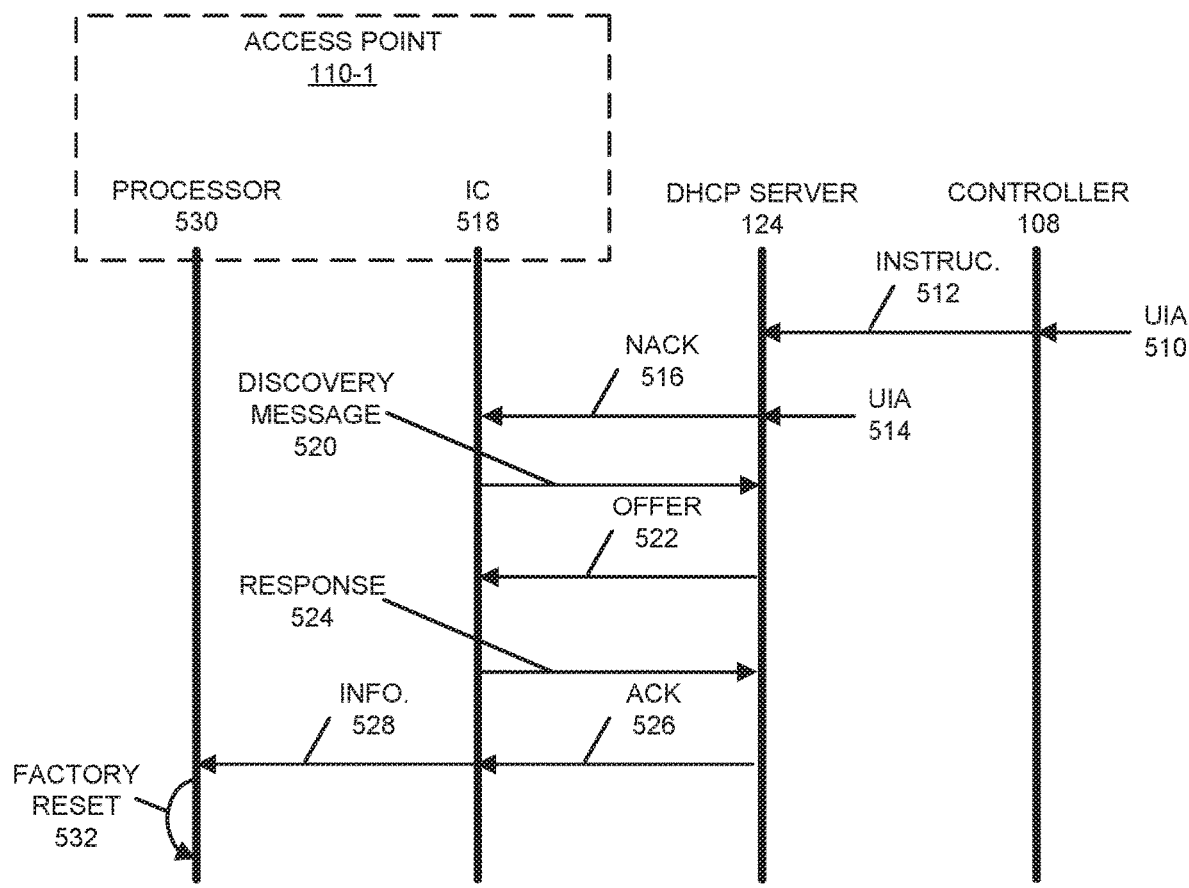
FIG. 5 is a drawing illustrating an example of communication among the electronic devices in FIG. 1 in accordance with an embodiment of the present disclosure.

FIG. 5 presents a drawing illustrating an example of communication among controller 126, DHCP server 124, and access point 110-1. During operation, controller 126 may receive user-interface activity (UTA) 510 from a user (such as use of a keyboard or a user interface on a touch-sensitive display, or a voice command). This user-interface activity may indicate that a factory reset of access point 110-1 is to be performed. In response, controller 126 may provide an instruction 512 to DHCP server 124 to perform a factory reset of access point 110-1.

Alternatively, controller 126 may receive user-interface activity 514 from the user (such as use of a keyboard or a user interface on a touch-sensitive display, or a voice command). This user-interface activity may indicate that a factory reset of access point 110-1 is to be performed.

Then, DHCP server 124 may perform the factory reset of access point 110-1. Notably, DHCP server 124 may provide a NACK 516 to access point 110-1. In response, access point 110-1 and DHCP server 124 may perform a DORA procedure. For example, after receiving NACK 516, an interface circuit (IC) 518 in access point 110-1 may provide a discover message 520 to DHCP server 124, and then DHCP server 124 may provide an offer 522 to access point 110-1. Next, interface circuit 518 may provide a response 524 to DHCP server 124, and then DHCP server 124 may provide an ACK 526 to access point 110-1. This ACK may include information 528 that specifies or indicates the factory reset of access point 110-1.

After receiving ACK 526, interface circuit 518 may provide information 528 to processor 530 in access point 110-1. Then, access point 110-1 may perform factory reset 532 based at least in part on information 528.

While FIG. 5 illustrates communication between components using unidirectional or bidirectional communication with lines having single arrows or double arrows, in general the communication in a given operation in this figure may involve unidirectional or bidirectional communication.

We now describe additional embodiments of the communication techniques. The use of wireless electronic devices is drastically increasing. These electronic devices may be capable of connecting to the Internet (and, more generally, a network) and accessing various networks, systems and/or content either via the Internet or a direct connection (e.g., secure link). The electronic devices may connect to the Internet either via a mobile network or via a local area network providing wireless communications, such as a wireless network or a Wi-Fi network. The Wi-Fi network is typically coupled to or connected to a broadband network and the broadband network is coupled to or connected to the Internet and may be capable of providing a secure link to other networks, systems and/or content.

Figure 6:
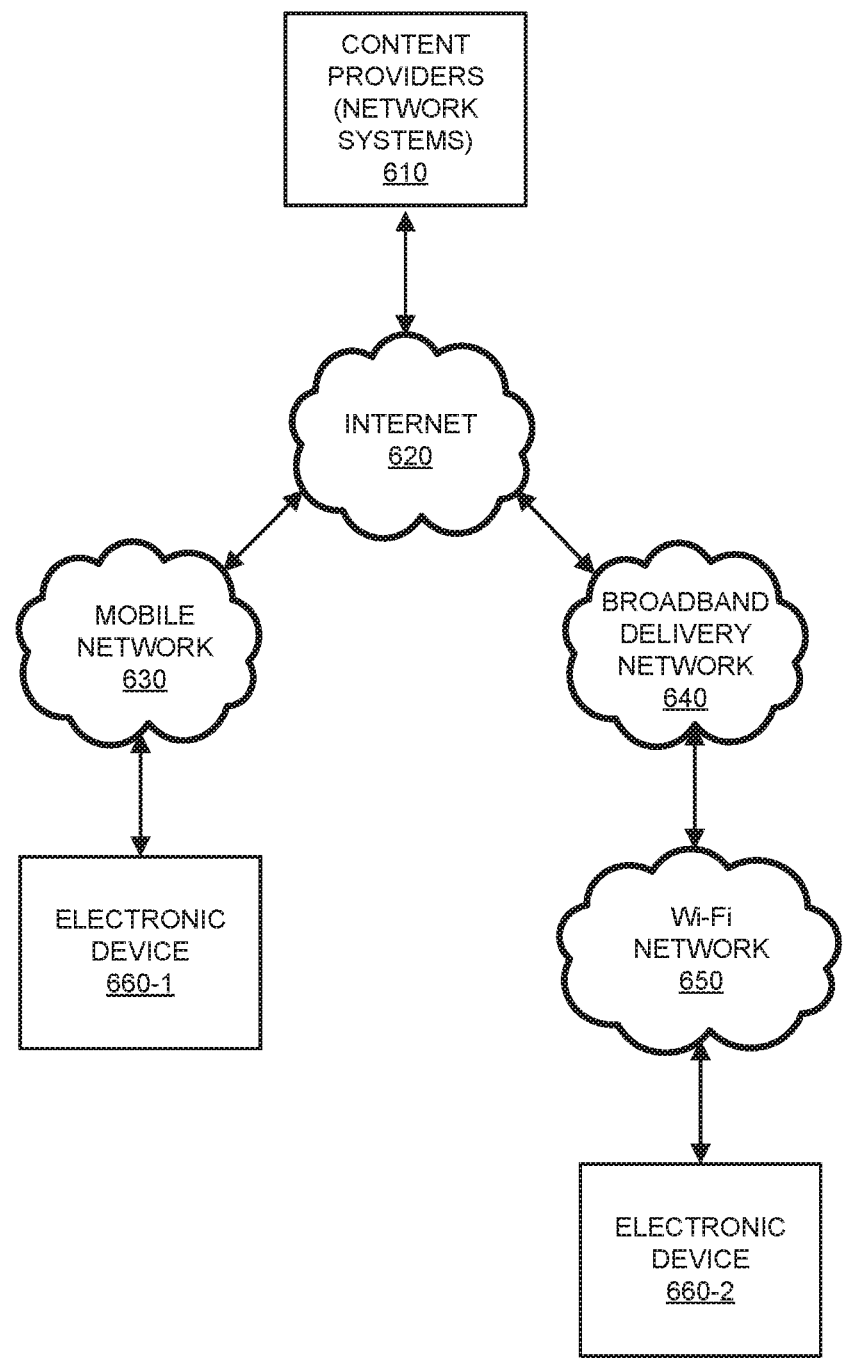
FIG. 6 is a drawing illustrating an example showing how wireless electronic devices may use the Internet to connect to content providers in accordance with an embodiment of the present disclosure.

FIG. 6 is a drawing illustrating an example showing how wireless electronic devices may use Internet 620 to connect to content providers (e.g., networks, systems, webpages, and/or content providers, which are henceforth referred to as 'content providers' 610) in accordance with an embodiment of the present disclosure. Moreover, electronic devices 660 may connect to Internet 620 and access content from content providers 610 via a mobile network 630, such as a cellular-telephone network provided by a cellular-telephone carrier. Electronic devices 660 may also connect to Internet 620 and access content from content providers 610 via a broadband delivery network (e.g., wide area network) 640 (which may be associated with a cable, telephone or satellite provider). Delivery network 640 may be, e.g., a cable network, a telephony network, and/or a satellite network. Furthermore, electronic devices 660 may connect to the delivery network 640 via a wireless local area network, such as a Wi-Fi network 650, that is connected to delivery network 640. In order to connect to Wi-Fi network 650, electronic devices 660 may need to be in close proximity to an access point. The access point may be, e.g., a wireless router. Note that non-wireless devices (e.g., desk top computers) may also connect to Wi-Fi network 650 via a wired connection to an access point.

Figure 7:
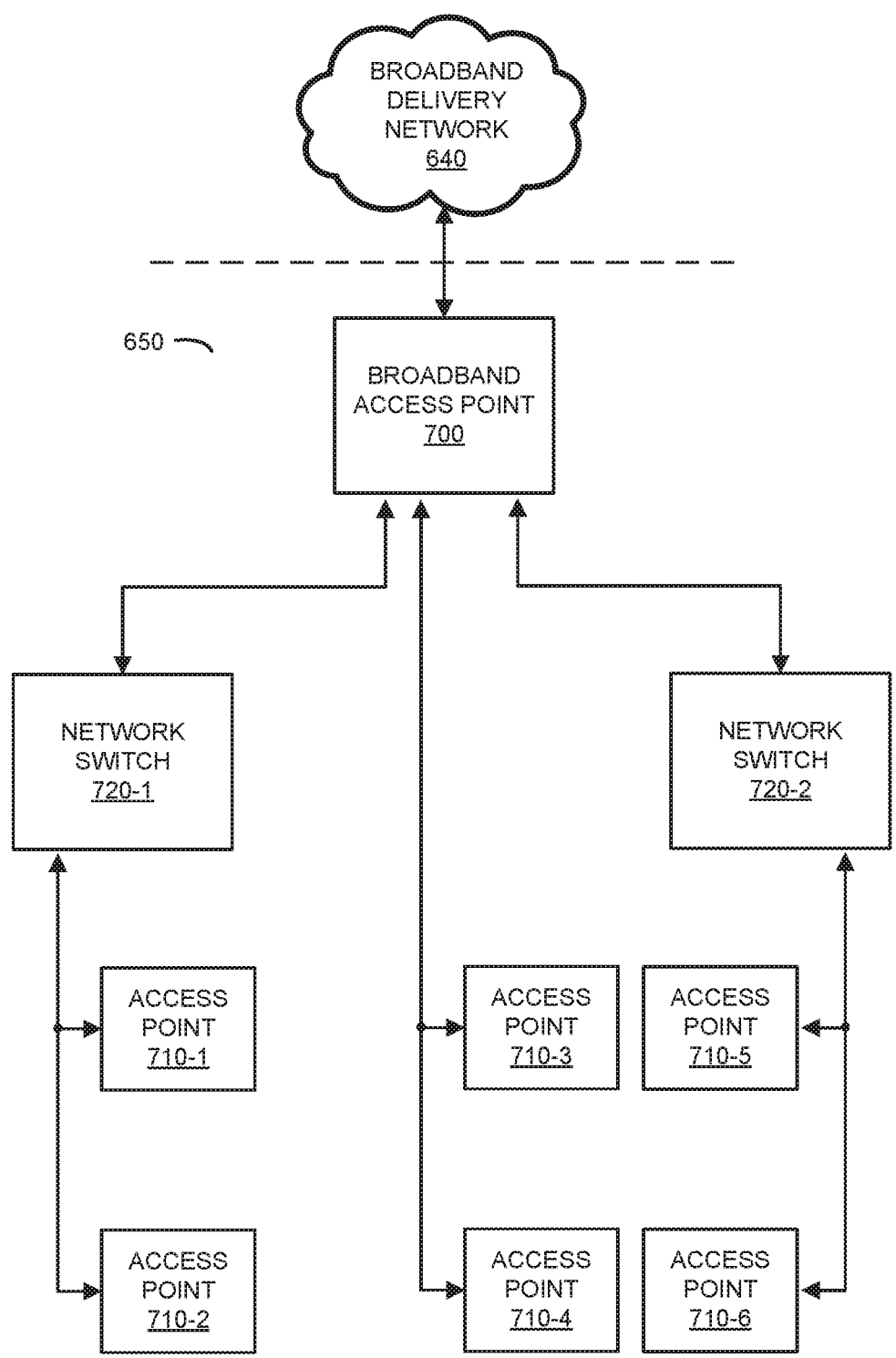
FIG. 7 is a block diagram illustrating an example of a Wi-Fi network in accordance with an embodiment of the present disclosure.

FIG. 7 is a block diagram illustrating an example of Wi-Fi network 650 in accordance with an embodiment of the present disclosure. Wi-Fi network 650 may include a broadband access point 700 for connecting to a broadband network 640. Moreover, Wi-Fi network 650 may also include one or more access points 710 that enable wireless electronic devices (not shown) as well as wired electronic devices (not shown) to connect to Wi-Fi network 650. Wi-Fi network 650 may also include one or more network switches 720 that route data to the various access points 710 and the electronic devices that are connected to or associated with access points 710. Furthermore, access points 710 may be connected to one another, broadband access point 700 and/or switches 720 via wired connections (e.g., Ethernet cables).

Access points 710 may be mounted in locations that do not restrict wireless connectivity (e.g., that are not surrounded by walls or other possible impediments to connectivity). For example, access points 710 may be mounted in ceilings, on top of poles, or the like. These locations support wireless connectivity and may not interfere with usable work space (e.g., desks) or floorspace. Moreover, access points 710 may be directly connected to a power source via a power cable or may receive power from, e.g., a switch 720 via a data cable connection (e.g., PoE). However, the location where access points 710 are installed makes them difficult to access if the need arises.

For example, sometimes a given one of access points 710 may become locked or get in a state where it is not operational. In order to get this access point out of the locked/non-operational state a simple restart of the access point may suffice. However, sometimes a factory reset may be required in order to remove all of the configuration information and return the access point to its factory-default or, in other words, an out-of-the-box state. A restart or factory reset may be performed by, e.g., remotely accessing the access point and providing the appropriate instructions. The access point may be accessed via, e.g., a network controller, a network administrator using secure shell (SSH), or a mobile electronic device that communicatively connects directly to the access point. However, if the access point is in a state where remote network access is not possible, then the appropriate actions may include physically accessing the access point to take necessary actions.

In some embodiments, the access point may be restarted by removing power from the access point and subsequently restoring power. This may be done by, e.g., halting the delivery of power from the electronic device that provides PoE (e.g., switch 720) temporarily, by removing connectivity to the power source temporarily (e.g., unplugging power cord from power source, unplugging power cord from the access point, etc.) or by flipping a power switch on the access point. Removing the power cord from the access point and/or turning off a power switch on the access point, may require that a user or a technician go to the location the access point. A factory reset may also require access to the access point in order to, e.g., press a factory reset button or insert an implement into a factory reset hole in the access point. Getting to the location of the access point may be a cumbersome, time-consuming and, possibly, a dangerous activity that requires equipment (e.g., ladder) and/or skilled personnel (e.g., a network administrator, facilities technician, maintenance, etc.).

In a network containing many access points 710 where a large number of them may need to be reconfigured (e.g., have a factory reset), having to physically access each one would require a large amount of resources. What is needed is a way to perform a factory reset that does not require remote network access to a given one of access points 710 and that does not require physical presence at the given access point.

These problems are addressed by the communication techniques. Notably, factory resets may be required at certain times to fix a non-operational electronic device. If the electronic device is not readily accessible and remote network access is not available, performing a factory reset may be difficult. Providing an external indication that the electronic device can process in its current non-operational state may be used to enable initiation of a remote factory reset. For example, the external indication may be PoE signaling provided by a PoE power source (such as a network switch) that can be processed when the electronic device is in current state. The external indication may include power toggling of the electronic device in a predefined pattern. Alternatively or additionally, the electronic device may include a microcontroller that can detect the changes in power state. The detected changes and the predefined pattern may be stored in an FPGA. Upon boot up, the electronic device may compare the detected changes and the stored pattern and may initiate a factory reset if they correspond to each other.

Figure 11:
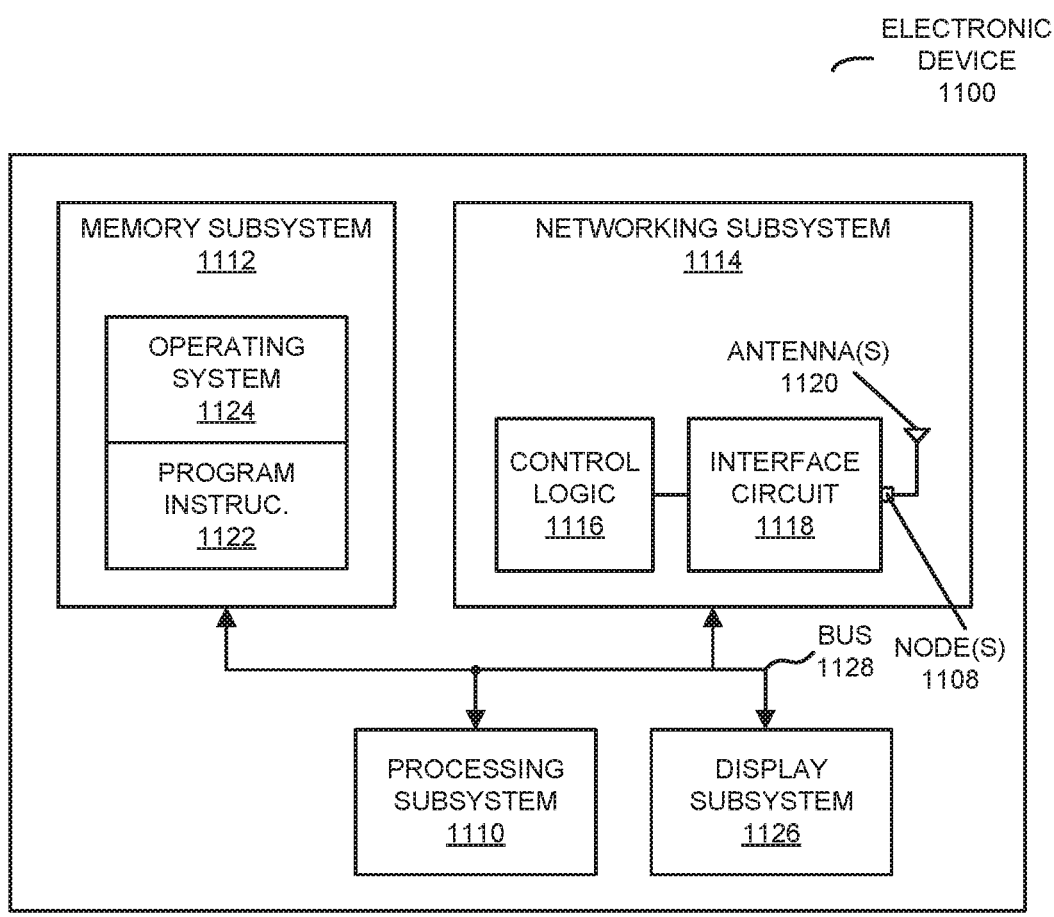
FIG. 11 is a block diagram illustrating an electronic device in accordance with an embodiment of the present disclosure.

As shown in FIG. 11, an electronic device 1100 may be remotely factory reset without having physical access to electronic device 1100. For example, electronic device 1100 may include: an access point, a gateway, a router, a bridge, a repeater and/or extender used in a network, such as a WLAN that provides wireless communication. In the discussion that follows, this network is referred to as a 'Wi-Fi network.' Note that electronic device 1100 may include a network subsystem 1114 with a network interface, a first Wi-Fi interface (including one or more first antennas) and/or a second Wi-Fi interface (including one or more second antennas). However, in some embodiments, electronic device 1100 may not include multiple Wi-Fi interfaces but rather may be limited to operating at a carrier frequency in a single band of frequencies.

The network interface may provide connectivity to and communications with a Wi-Fi network. For example, the network interface may include a connector, such as, an Ethernet connector for receiving an Ethernet cable, and associated protocols for providing communication with the Wi-Fi network (e.g., receiving and/or transmitting data). Moreover, the network interface may receive power for electronic device 1100, e.g., via a switch, to which access point 1100 is connected. This switch may include a PoE switch and the network interface may include a PoE network interface, so that power can also be provided to electronic device 1100 over an Ethernet cable. Note that electronic device 1100 may not receive power via the network interface. Instead, electronic device 1100 may include a power interface (not shown) that receives power from a power source via a power cable.

Furthermore, the first Wi-Fi interface and/or the second Wi-Fi interface may provide Wi-Fi communication between electronic device 1100 and one or more other electronic devices. For example, the first Wi-Fi interface may establish a Wi-Fi network operating using a first carrier frequency in a first band of frequencies (e.g., a 5 GHz network pursuant to IEEE 802.11a) and the second Wi-Fi interface may be to establish a Wi-Fi network operating using a second carrier frequency in a second band of frequencies (e.g., a 2.4 GHz network pursuant to IEEE 802.11b,g). In some embodiments, it is possible that a single integrated circuit includes multiple antennas and can provide communications at different frequencies (e.g., a 2.4 and a 5 GHz network pursuant to IEEE 802.11n). Note that the one or more other electronic devices may use electronic device 1100 to communicate via the Wi-Fi network using wireless communication or to communicate via a broadband network using wired communication (such as when electronic device 1100 is a gateway).

Electronic device 1100 may include processing subsystem 1110 that controls operation of electronic device 1100. For example, a processor in processing subsystem 1110 may execute program instructions 1122 (e.g., software, an application, etc.). When executed, program instructions 1122 may cause the processor to control the operations of electronic device 1100 and to perform various functions, such as routing information between electronic devices connected to electronic device 1100 and the Wi-Fi network, and providing remote network access to electronic device 1100 in order to configure and/or control electronic device 1100. In addition, the processor may execute program instructions 1122 to enable electronic device 1100 to receive and process PoE signaling from a PoE power source (e.g., a PoE switch). The PoE signaling may, e.g., indicate the presence of electronic device 1100 and negotiate an amount of available and/or required power for electronic device 1100. As discussed further below, the PoE signaling may be expanded to convey additional information.

Moreover, electronic device 1100 may include memory subsystem 1112 that stores program instructions 1122 and/or other data. For example, the other data may include configuration data (e.g., a set-up of the Wi-Fi network, what switch electronic device 1100 is connected to, etc.) and/or connectivity data (e.g., electronic devices that are associated with or connected to actively, signal strengths of the connected electronic devices, etc.).

Memory subsystem 1112 may be located on the processor and/or may be separate from the processor. Note that memory subsystem 1112 may include computer-readable memory, so that the processor can read and execute program instructions 1122.

Furthermore, electronic device 1100 may include a user interface (not shown) with, e.g., lights that provide an indication about the operational status of electronic device 1100. The user interface may also include switches, buttons, etc. that allow a user to power electronic device 1100 on/off and/or to factory reset electronic device 1100.

As discussed previously, electronic device 1100 may get into a state where it is not fully functioning and potentially not operationally functioning at all (e.g., program instructions 1122 associated with operation of electronic device 1100 are either not being executed by the processor or when executed by the processor are not causing the processor to operate correctly) for a variety of reasons. When this occurs, electronic device 1100 may require a factory reset. Moreover, when electronic device 1100 is in this state, remote network access via any of the typical options (e.g., a network controller, a network administrator, another electronic device, etc.) may not be available. Furthermore, when electronic device 1100 is in this state it may not be capable of performing certain functions, including communicating with the Wi-Fi network and/or one or more other electronic devices (e.g., routing information between the electronic devices connected to electronic device 1100 and the Wi-Fi network). An external indication that electronic device 1100 can process in this state may be needed in order to initiate a factory reset. This external indication may need to be capable of being acted on by the processor when electronic device 1100 is in this state (and, thus, may not need functional program instructions stored in the memory to cause the processor to control the functional operations of electronic device 1100 when executed).

According to some embodiments, the external indication may be received from a PoE power source (e.g., a PoE network switch) that provides PoE to electronic device 1100. The external indication may include expanded PoE signaling that directs electronic device 1100 to perform certain operations on itself (e.g., a factory reset). The switch may send the expanded PoE signaling to electronic device 1100, and electronic device 1100 may be able to recognize and process the signaling while it is in a state requiring a factory reset. Thus, the processor may be able to execute program instructions 1122 stored in the memory associated with PoE and the operation of electronic device 1100 even if the functional program instructions are not operating correctly.

Electronic device 1100 may initiate a factory reset (which may be the same as if a factory reset button hidden in a hole in a housing of electronic device 1100 was depressed with, e.g., a paper clip) based at least in part on the PoE signaling. The use of PoE signaling may enable electronic device 1100 to be factory reset remotely when electronic device 1100 is in a state requiring a factory reset, when electronic device 1100 is not operationally functioning correctly, and/or when remote network access to electronic device 1100 is not available.

For example, the switch may be remotely accessed in order to have the appropriate signaling generated and sent to electronic device 1100. The factory reset signaling may include: standard signals, vendor-specific (e.g., manufacturer, provider, etc.) signals, or electronic-device-specific (e.g. make, model, etc.) signals.

Figure 8:
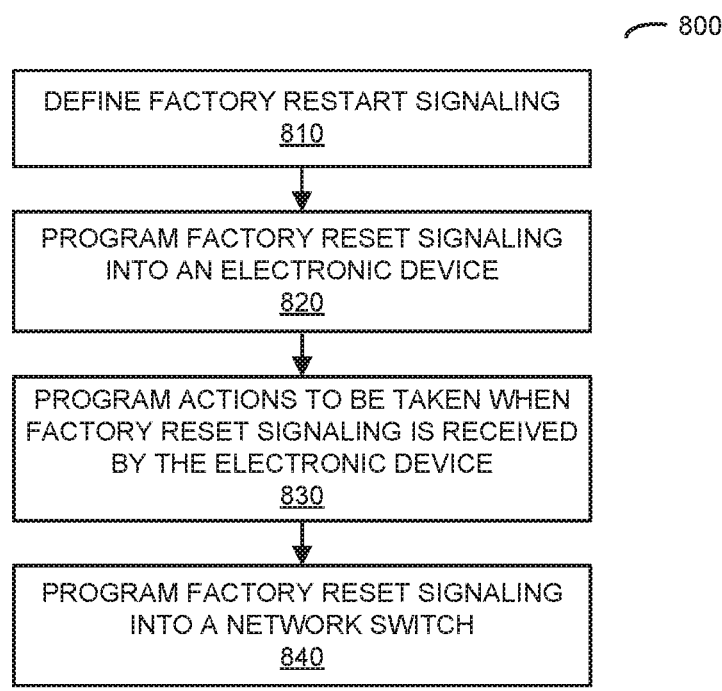
FIG. 8 is a flow diagram illustrating an example method for defining Power over Ethernet (PoE) signaling for initiating a factory reset in accordance with an embodiment of the present disclosure.

FIG. 8 presents a flow diagram illustrating an example method 800 for defining PoE signaling for initiating a factory reset in accordance with an embodiment of the present disclosure. Initially, the factory reset signalizing may be optionally defined (operation 810), such as a predefined power pattern. The signaling may be unique for the specific electronic device or vendor. Then, the signalizing may be programmed into the electronic device (operation 820) and the actions to be taken when the signaling is received may be defined and programmed into the electronic device (operation 830). Note that the actions to be taken when the factory reset signaling is received may include mimicking actions taken when the factory reset button is depressed. The signaling may then be programmed in the switch, such as the PoE power source (operation 840). The programming of the signaling in the switch may include defining a user interface that allows the switch to select factory reset as an action and select the electronic device it is directed to. In response, the switch may generate the appropriate signaling based on the selections made on the user interface and may send the signaling to the appropriate electronic device.

In some embodiments, operations 820 and/or 830 may entail defining program instructions 1122 stored in the memory and executed by the processor. Moreover, operation 840 may entail defining program instructions stored in memory and executed by a processor in the network switch.

Figure 9:
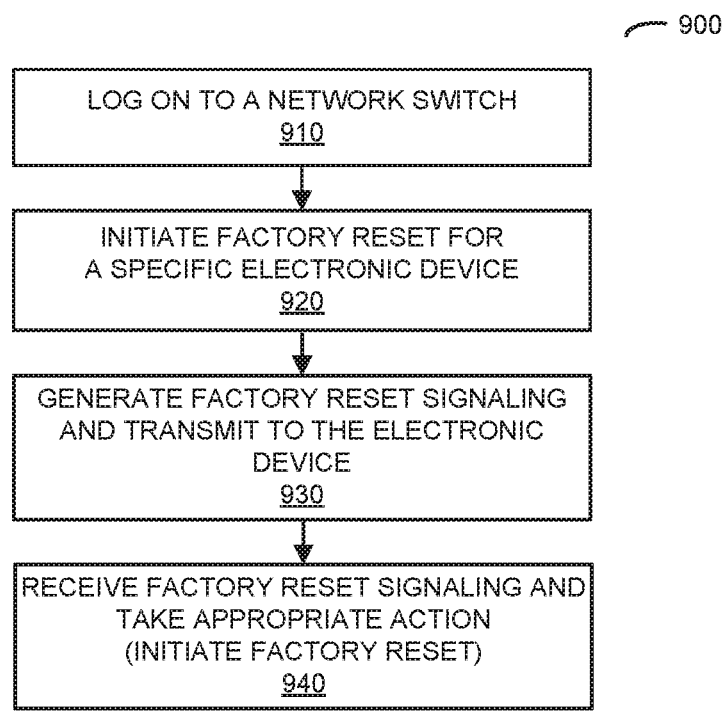
FIG. 9 is a flow diagram illustrating an example method for remotely initiating a factory reset using PoE signaling from a network switch in accordance with an embodiment of the present disclosure.

FIG. 9 presents a flow diagram illustrating an example method 900 for remotely initiating a factory reset using PoE signaling from a network switch (which may be a PoE power source) in accordance with an embodiment of the present disclosure. Initially, a user may log onto the network switch (operation 910) and may initiate a remote factory reset for a specific electronic device (operation 920). The initiating of the remote factory reset on the switch may entail activating a user interface and selecting the factory reset option and selecting the specific electronic device connected to the switch. Then, the appropriate PoE signaling may be generated and transmitted to the electronic device (operation 930). The electronic device may receive the PoE signaling and may take the appropriate action based at least in part on the PoE signaling (operation 940). Note that the appropriate action when the factory reset PoE signaling is received may be to imitate a factory reset similar, if not identical, to the process that is invoked when a manual factory reset is initiated by, e.g., depressing a factory reset button.

In some embodiments, operations 910, 920 and/or 930 are performed by the network switch and may entail program instructions stored in memory being executed by a processor. Moreover, the operations defined in operation 940 may be performed by electronic device 1100 and may entail program instructions 1122 stored in the memory being executed by the processor.

Returning back to FIG. 11, in some embodiments electronic device 1100 may not receive PoE and, thus, may not be capable of receiving factory reset PoE signaling. Furthermore, even if electronic device 1100 receives PoE, the factory reset PoE signaling may not be defined in the network switch (which may be the PoE power source) and/or electronic device 1100. Consequently, in some embodiments, the external indication for initiating a remote factory reset of electronic device 1100 may be one or more unique power sequences. The one or more unique power sequences may be controlled by a network power switch, a PoE network switch and/or physically controlled. The network power switch may provide remote access to turn on/off the power to electronic device 1100 using, e.g., a WLAN, wireless communication (e.g., Wi-Fi), mobile communications (e.g., LTE, 5G), text communication (e.g., SMS) and/or the Internet. The PoE switch may turn on/off the power it supplies. The power may be physically controlled by, e.g., removing the power cord for electronic device 1100. The embodiments may, therefore, require additional functionality and possibly additional components to detect the one or more unique power sequences. For example, electronic device 1100 may include a microcontroller and/or an FPGA.

The microcontroller may be able to detect changes in the power state of electronic device 1100. For example, the microcontroller may detect when power is removed from electronic device 1100 and/or when power is applied to electronic device 1100. Moreover, the microcontroller may be able to detect the power state changes after electronic device 1100 has lost power and/or prior to electronic device 1100 rebooting after the power has been reapplied. In order to detect the changes in power state (e.g., the loss of power), the microcontroller may require an alternative power source. According to some embodiments, the microcontroller may include a power state register that is, e.g., set to a first value (e.g., '0') when no power (or power below a predefined voltage or amperage) is received and is set to a second value (e.g., '1') when operational power is applied. Furthermore, the microcontroller may be capable of detecting when power is applied (or is above the minimal level) and is below an operational value and set the power state register to a third value (e.g., '2'). This type of power application may not be provided by physically toggling the power, but may be provided by a network power switch and/or a PoE switch.

Once the microcontroller sets the power register to the second value (or the third value), the microcontroller may record the value and the associated time. For example, the time and power state value may be recorded in the FPGA, the memory or another register.

Additionally, the FPGA may store data representing a predefined power pattern corresponding to a received power pattern that will initiate a factory reset. The predefined power pattern may be, e.g., a certain number of toggles in power in a certain amount of time (or a time interval, such as 5 or 10 s). According to some embodiments, the toggles may be the initiation of an operational power state (which would indicate a toggle from a non-power state). Moreover, the predefined power pattern may be a pattern that is not likely to happen as a result of power fluctuations in order to prevent inadvertent factory resetting of electronic device 1100. By way of example, the predefined power pattern may be a number of power cycles (e.g., three or five power cycles) within a time period such as a predefined number of seconds (e.g., within 8 or 10 s).

In some embodiments, e.g., if the received power pattern is going to be provided by an network power switch and/or a PoE switch, the power that is toggled may be, in one power state, at a non-zero voltage different from a voltage of operational power, or at a non-zero amperage different from an amperage of operational power (e.g., at a voltage or amperage below that of normal operational conditions), so as to generate, e.g., the third power state value described previously. The predefined power pattern may accordingly be the initiation of the below-operational power state a predefined number of times within a predefined period of time. According to some embodiments, the predefined power pattern may be the toggling of power between the different power states (operational and below operational). By way of example, the predefined power pattern may be an alternating of second and third power state values four times (e.g., 1, 2, 1, 2) within 10 seconds.

The FPGA may store data representing the power states detected by the microcontroller. Once electronic device 1100 is able to fully boot up, the processor may compare the stored power state toggles recorded in the FPGA by the microcontroller to the predefined power pattern defined or stored in the FPGA. If the power patterns correspond (e.g., match) each other, the processor may initiate a factory reset of electronic device 1100.

Figure 10:
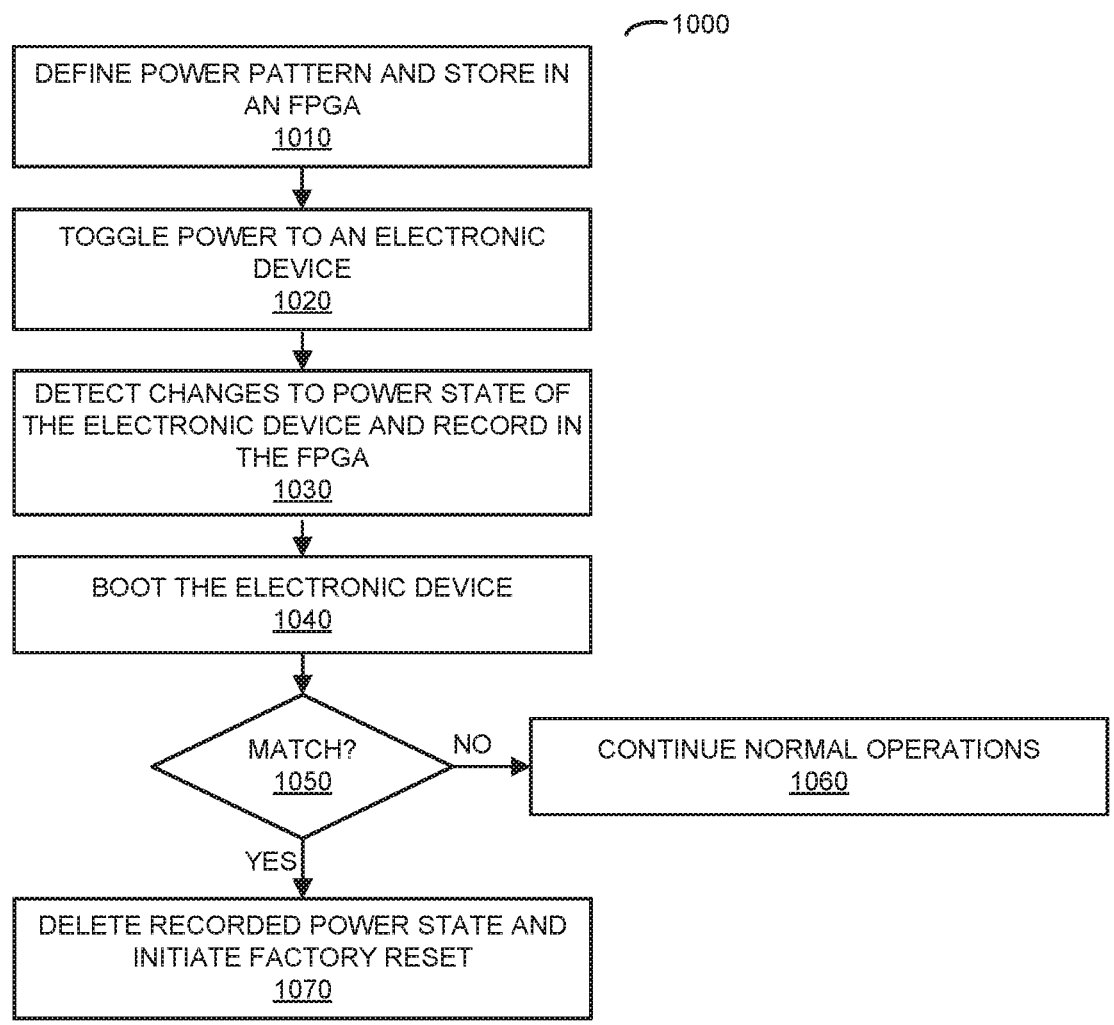
FIG. 10 is a flow diagram illustrating an example method for remotely initiating a factory reset using power patterns in accordance with an embodiment of the present disclosure.

FIG. 10 presents a flow diagram illustrating an example method 1000 for remotely initiating a factory reset using power patterns in accordance with an embodiment of the present disclosure. Initially, a power pattern may be defined and is stored in an FPGA of the electronic device (operation 1010). When a factory reset is desired, the power provided to the electronic device may be toggled off and then on in accordance with the predefined pattern (operation 1020). The toggling of the power may be performed by, e.g., a network power switch (e.g., a user may initiate the sequence or may manually control the sequence) or may be manually invoked (e.g., unplugging/plugging a power cord). The microcontroller may detect each change in the power state (e.g., toggle to an on state) and record the associated time in the FPGA (operation 1030). According to some embodiments, the microcontroller may detect a toggling to a power state that is below an operation level (e.g., a third value). Once the toggling of the power ends, the electronic device may be allowed to fully boot (operation 1040). Moreover, once the electronic device is fully booted, the recorded toggling of power states may be compared to the predefined power pattern (operation 1050). That is, a determination may be made as to whether the appropriate number of power state toggles occurred with a certain time interval (e.g., 3 power-on states recorded within 10 seconds). If the recorded toggling does not correspond (e.g., as a matching pattern) to the predefined power pattern (operation 1050), then the electronic device may continue normal operations (operation 1060). Alternatively, if the recorded toggling matches the predefined power pattern (operation 1050), then the recorded power states may be erased or removed, and a factory reset may be initiated (operation 1070).

Note that operation 1020 may be performed by a network power switch and may entail program instructions stored in memory being executed by a processor. Moreover, operation 1030 may be performed by electronic device 1100 and may entail the microcontroller performing specified actions. Furthermore, operations 1040, 1050, 1060 and/or 1070 may be performed by electronic device 1100 and may entail program instructions 1122 stored in the memory being executed by the processor.

In some embodiments of methods 800 (FIG. 8), 900 (FIG. 9) and/or 1000, there may be additional or fewer operations. Furthermore, the order of the operations may be changed, and/or two or more operations may be combined into a single operation.

The various embodiments described previously have been described with respect to the performing a remote factory reset of an electronic device where remote network access to the electronic device is not available. In some embodiments, the electronic device includes an access point. However, the various embodiments are not limited to access points. Rather, the various embodiments may be applied to other network equipment, customer premises equipment or another type of electronic device.

We now describe embodiments of an electronic device, which may perform at least some of the operations in the communication techniques. FIG. 11 presents a block diagram illustrating an example of an electronic device 1100 in accordance with some embodiments, such as one of access points 110, electronic devices 112, DHCP server 124, controller 126, or a switch (such as a network power switch, a PoE switch, etc.). This electronic device includes processing subsystem 1110, memory subsystem 1112, and networking subsystem 1114. Processing subsystem 1110 includes one or more devices configured to perform computational operations. For example, processing subsystem 1110 can include one or more microprocessors, ASICs, microcontrollers, programmable-logic devices (such as one or more FPGAs), one or more graphics process units (GPUs) and/or one or more digital signal processors (DSPs).

Memory subsystem 1112 includes one or more devices for storing data and/or instructions for processing subsystem 1110 and networking subsystem 1114. For example, memory subsystem 1112 can include dynamic random access memory (DRAM), static random access memory (SRAM), and/or other types of memory. In some embodiments, instructions for processing subsystem 1110 in memory subsystem 1112 include: one or more program modules or sets of instructions (such as program instructions 1122 or operating system 1124), which may be executed by processing subsystem 1110. Note that the one or more computer programs may constitute a computer-program mechanism. Moreover, instructions in the various modules in memory subsystem 1112 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 1110.

In addition, memory subsystem 1112 can include mechanisms for controlling access to the memory. In some embodiments, memory subsystem 1112 includes a memory hierarchy that comprises one or more caches coupled to a memory in electronic device 1100. In some of these embodiments, one or more of the caches is located in processing subsystem 1110.

In some embodiments, memory subsystem 1112 is coupled to one or more high-capacity mass-storage devices (not shown). For example, memory subsystem 1112 can be coupled to a magnetic or optical drive, a solid-state drive, or another type of mass-storage device. In these embodiments, memory subsystem 1112 can be used by electronic device 1100 as fast-access storage for often-used data, while the mass-storage device is used to store less frequently used data.

Networking subsystem 1114 includes one or more devices configured to couple to and communicate on a wired and/or wireless network (i.e., to perform network operations), including: control logic 1116, an interface circuit 1118 and one or more antennas 1120 (or antenna elements). (While FIG. 11 includes one or more antennas 1120, in some embodiments electronic device 1100 includes one or more nodes, such as nodes 1108, e.g., a network node that can be connected or coupled to a network, or a connector or a pad that can be coupled to the one or more antennas 1120. Thus, electronic device 1100 may or may not include the one or more antennas 1120.) For example, networking subsystem 1114 can include a Bluetooth™ networking system, a cellular networking system (e.g., a 3G/4G/5G network such as UMTS, LTE, etc.), a universal serial bus (USB) networking system, a networking system based on the standards described in IEEE 802.11 (e.g., a Wi-Fi® networking system), an Ethernet networking system, a cable modem networking system, and/or another networking system.

Note that a transmit or receive antenna pattern (or antenna radiation pattern) of electronic device 1100 may be adapted or changed using pattern shapers (such as reflectors) in one or more antennas 1120 (or antenna elements), which can be independently and selectively electrically coupled to ground to steer the transmit antenna pattern in different directions. Thus, if one or more antennas 1120 include N antenna pattern shapers, the one or more antennas may have $2^N$ different antenna pattern configurations. More generally, a given antenna pattern may include amplitudes and/or phases of signals that specify a direction of the main or primary lobe of the given antenna pattern, as well as so-called 'exclusion regions' or 'exclusion zones' (which are sometimes referred to as 'notches' or 'nulls'). Note that an exclusion zone of the given antenna pattern includes a low-intensity region of the given antenna pattern. While the intensity is not necessarily zero in the exclusion zone, it may be below a threshold, such as 3 dB or lower than the peak gain of the given antenna pattern. Thus, the given antenna pattern may include a local maximum (e.g., a primary beam) that directs gain in the direction of electronic device 1100 that is of interest, and one or more local minima that reduce gain in the direction of other electronic devices that are not of interest. In this way, the given antenna pattern may be selected so that communication that is undesirable (such as with the other electronic devices) is avoided to reduce or eliminate adverse effects, such as interference or crosstalk.

Networking subsystem 1114 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 1100 may use the mechanisms in networking subsystem 1114 for performing simple wireless communication between the electronic devices, e.g., transmitting advertising or beacon frames and/or scanning for advertising frames transmitted by other electronic devices as described previously.

Within electronic device 1100, processing subsystem 1110, memory subsystem 1112, and networking subsystem 1114 are coupled together using bus 1128. Bus 1128 may include an electrical, optical, and/or electro-optical connection that the subsystems can use to communicate commands and data among one another. Although only one bus 1128 is shown for clarity, different embodiments can include a different number or configuration of electrical, optical, and/or electro-optical connections among the subsystems.

In some embodiments, electronic device 1100 includes a display subsystem 1126 for displaying information on a display, which may include a display driver and the display, such as a liquid-crystal display, a multi-touch touchscreen, etc.

Electronic device 1100 can be (or can be included in) any electronic device with at least one network interface. For example, electronic device 1100 can be (or can be included in): a desktop computer, a laptop computer, a subnotebook/netbook, a server, a tablet computer, a smartphone, a cellular telephone, a smartwatch, a consumer-electronic device, a portable computing device, an access point, a transceiver, a router, a switch, communication equipment, an access point, a controller, test equipment, and/or another electronic device.

Although specific components are used to describe electronic device 1100, in alternative embodiments, different components and/or subsystems may be present in electronic device 1100. For example, electronic device 1100 may include one or more additional processing subsystems, memory subsystems, networking subsystems, and/or display subsystems. Additionally, one or more of the subsystems may not be present in electronic device 1100. Moreover, in some embodiments, electronic device 1100 may include one or more additional subsystems that are not shown in FIG. 11. Also, although separate subsystems are shown in FIG. 11, in some embodiments some or all of a given subsystem or component can be integrated into one or more of the other subsystems or component(s) in electronic device 1100. For example, in some embodiments program instructions 1122 are included in operating system 1124 and/or control logic 1116 is included in interface circuit 1118. In some embodiments, the communication techniques are implemented using information in layer 2 and/or layer 3 of the Open System Interconnection model.

Moreover, the circuits and components in electronic device 1100 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 1114 (or, more generally, of electronic device 1100). The integrated circuit may include hardware and/or software mechanisms that are used for transmitting wireless signals from electronic device 1100 and receiving signals at electronic device 1100 from other electronic devices. Aside from the mechanisms herein described, radios are generally known in the art and hence are not described in detail. In general, networking subsystem 1114 and/or the integrated circuit can include any number of radios. Note that the radios in multiple-radio embodiments function in a similar way to the described single-radio embodiments.

In some embodiments, networking subsystem 1114 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals).

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used Ethernet and a Wi-Fi communication protocol as an illustrative example, in other embodiments a wide variety of communication protocols and, more generally, wired and/or wireless communication techniques may be used. Thus, the communication techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication techniques may be implemented using program instructions 1122, operating system 1124 (such as a driver for interface circuit 1118) or in firmware in interface circuit 1118. Alternatively or additionally, at least some of the operations in the communication techniques may be implemented in a physical layer, such as hardware in interface circuit 1118.

In the preceding description, we refer to 'some embodiments.' Note that 'some embodiments' describes a subset of all of the possible embodiments, but does not always specify the same subset of embodiments. Moreover, note that numerical values in the preceding embodiments are illustrative examples of some embodiments. In other embodiments of the communication techniques, different numerical values may be used.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
    an interface circuit configured to communicate with a second electronic device, and wherein the electronic device is configured to:
        receive using wired or wireless communication, a packet or a frame associated with the second electronic device, wherein the packet or the frame comprises information specifying a factory reset command, wherein the packet or the frame comprises an acknowledgment (ACK) in a discover, offer, request and acknowledgment (DORA) procedure, and wherein the information is included in an option 43 subfield or an option 52 subfield in the packet or the frame, and the packet or the frame comprises a dynamic host configuration protocol (DHCP) ACK; and
        perform the factory reset in response to receiving the factory reset command, wherein the factory reset restores firmware in the electronic device to a factory-fresh version and a configuration of the electronic device to a factory-fresh state; and
        wherein the factory reset erases memory in the electronic device.

2. The electronic device of claim 1, wherein the second electronic device comprises a DHCP server or performs functions of a DHCP server.

3. The electronic device of claim 1, wherein the second electronic device comprises an access point or a controller of the electronic device.

4. The electronic device of claim 1, wherein the electronic device is configured to:
    determine whether a predefined time interval has elapsed; and
    when the predefined time interval has elapsed, provide a discover message addressed to the second electronic device, wherein the discover message initiates the DORA procedure.

5. The electronic device of claim 1, wherein the electronic device is configured to:
    receive a negative acknowledgment (NACK) associated with the second electronic device; and
    in response to receiving the NACK, provide a discover message addressed to the second electronic device, wherein the discover message initiates the DORA procedure.

6. The electronic device of claim 1, wherein the electronic device is configured to ignore the packet or the frame when received outside of a predefined time interval or when a number of received instances of the packet or the frame exceeds a predefined value.

7. The electronic device of claim 1, wherein the electronic device comprises:
    memory configured to store program instructions; and
    a processor, coupled to the memory, configured to execute the program instructions, wherein, when executed by the processor, the program instructions cause the electronic device to perform the factory reset.

8. The electronic device of claim 1, wherein the information is instead of or in addition to an Internet Protocol (IP) address.

9. A non-transitory computer-readable storage medium for use in conjunction with an electronic device, the computer-readable storage medium storing program instructions that, when executed by the electronic device, causes the electronic device to perform operations comprising:
receiving, using wired or wireless communication, a packet or a frame associated with a second electronic device, wherein the packet or the frame comprises information specifying a factory reset command, wherein the packet or the frame comprises an acknowledgment (ACK) in a discover, offer, request and acknowledgment (DORA) procedure, and wherein the information is included in an option 43 subfield or an option 52 subfield in the packet or the frame, and the packet or the frame comprises a dynamic host configuration protocol (DHCP) ACK; and
performing the factory reset in response to receiving the factory reset command, wherein the factory reset restores firmware in the electronic device to a factory-fresh version and a configuration of the electronic device to a factory-fresh state; and
wherein the factory reset erases memory in the electronic device.

10. The non-transitory computer-readable storage medium of claim 9, wherein the second electronic device comprises a DHCP server or performs functions of a DHCP server.

11. The non-transitory computer-readable storage medium of claim 9, wherein the operations comprise:
determining whether a predefined time interval has elapsed; and
when the predefined time interval has elapsed, providing a discover message addressed to the second electronic device, wherein the discover message initiates the DORA procedure.

12. The non-transitory computer-readable storage medium of claim 9, wherein the operations comprise:
receiving a negative acknowledgment (NACK) associated with the second electronic device; and
in response to receiving the NACK, providing a discover message addressed to the second electronic device, wherein the discover message initiates the DORA procedure.

13. The non-transitory computer-readable storage medium of claim 9, wherein the operations comprise ignoring the packet or the frame when received outside of a predefined time interval or when a number of received instances of the packet or the frame exceeds a predefined value.

14. The non-transitory computer-readable storage medium of claim 9, wherein the second electronic device comprises an access point or a controller of the electronic device.

15. A method for performing a factory reset, comprising:
by an electronic device:
receiving, using wired or wireless communication, a packet or a frame associated with a second electronic device, wherein the packet or the frame comprises information specifying a factory reset command, wherein the packet or the frame comprises an acknowledgment (ACK) in a discover, offer, request and acknowledgment (DORA) procedure, and wherein the information is included in an option 43 subfield or an option 52 subfield in the packet or the frame, and the packet or the frame comprises a dynamic host configuration protocol (DHCP) ACK; and
performing the factory reset in response to receiving the factory reset command, wherein the factory reset restores firmware in the electronic device to a factory-fresh version and a configuration of the electronic device to a factory-fresh state; and
wherein the factory reset erases memory in the electronic device.

16. The method of claim 15, wherein the second electronic device comprises an access point or a controller of the electronic device.

17. The method of claim 15, wherein the second electronic device comprises a DHCP server or performs functions of a DHCP server.

18. The method of claim 15, wherein the method comprises:
determining whether a predefined time interval has elapsed; and
when the predefined time interval has elapsed, providing a discover message addressed to the second electronic device, wherein the discover message initiates the DORA procedure.

19. The method of claim 15, wherein the method comprises:
receiving a negative acknowledgment (NACK) associated with the second electronic device; and
in response to receiving the NACK, providing a discover message addressed to the second electronic device, wherein the discover message initiates the DORA procedure.

20. The method of claim 15, wherein the method comprises ignoring the packet or the frame when received outside of a predefined time interval or when a number of received instances of the packet or the frame exceeds a predefined value.

* * * * *